United States Patent [19]

Kramer et al.

[11] Patent Number: 5,046,433
[45] Date of Patent: Sep. 10, 1991

[54] ADJUSTABLE FOLDING TRAY APPARATUS FOR ATTACHMENT TO A VEHICLE SEAT BACK

[76] Inventors: Randall Kramer; Mary Kramer, both of 2401 Fir St., Glenview, Ill. 60025

[21] Appl. No.: 355,157

[22] Filed: May 22, 1989

[51] Int. Cl.⁵ .............................................. A47B 23/00
[52] U.S. Cl. ..................... 108/44; 297/163; 297/191
[58] Field of Search ............... 297/255, 163, 191, 256; 108/44, 149, 47, 42

[56] References Cited

U.S. PATENT DOCUMENTS

| | | | |
|---|---|---|---|
| 2,025,393 | 12/1935 | Kupfer | 297/191 X |
| 2,483,043 | 9/1949 | Golden | 108/149 X |
| 2,503,602 | 4/1950 | Titley | 108/44 X |
| 2,557,874 | 6/1951 | Kailenta | 297/256 |
| 2,798,780 | 7/1957 | Motorney | 108/47 X |
| 2,837,388 | 6/1958 | Majeroni et al. | 108/44 X |
| 2,878,945 | 3/1959 | Speir | 108/44 X |
| 2,889,051 | 6/1959 | Kramer | 108/44 X |
| 3,050,355 | 8/1962 | Hess et al. | 297/163 X |
| 3,061,371 | 10/1962 | Benoit | 297/256 |
| 4,466,659 | 8/1984 | Carpentier | 297/191 |

Primary Examiner—Peter A. Aschenbrenner
Attorney, Agent, or Firm—Dick and Harris

[57] ABSTRACT

An adjustable folding table apparatus for attachment to a seat back for use primarily within an automobile or other vehicle, including a tray portion rotatable between a substantially vertical stored position and a substantially horizontal extended position, suspended from a portion of the seat back and employing a series of flexible straps to enable both facilitated attachment and detachment of the apparatus from the seat back, as well as adjustment of the vertical and/or angular orientation of the tray apparatus. A latch or catch serves to retain the tray portion in a folded up or stored position until it is dislodged.

19 Claims, 3 Drawing Sheets

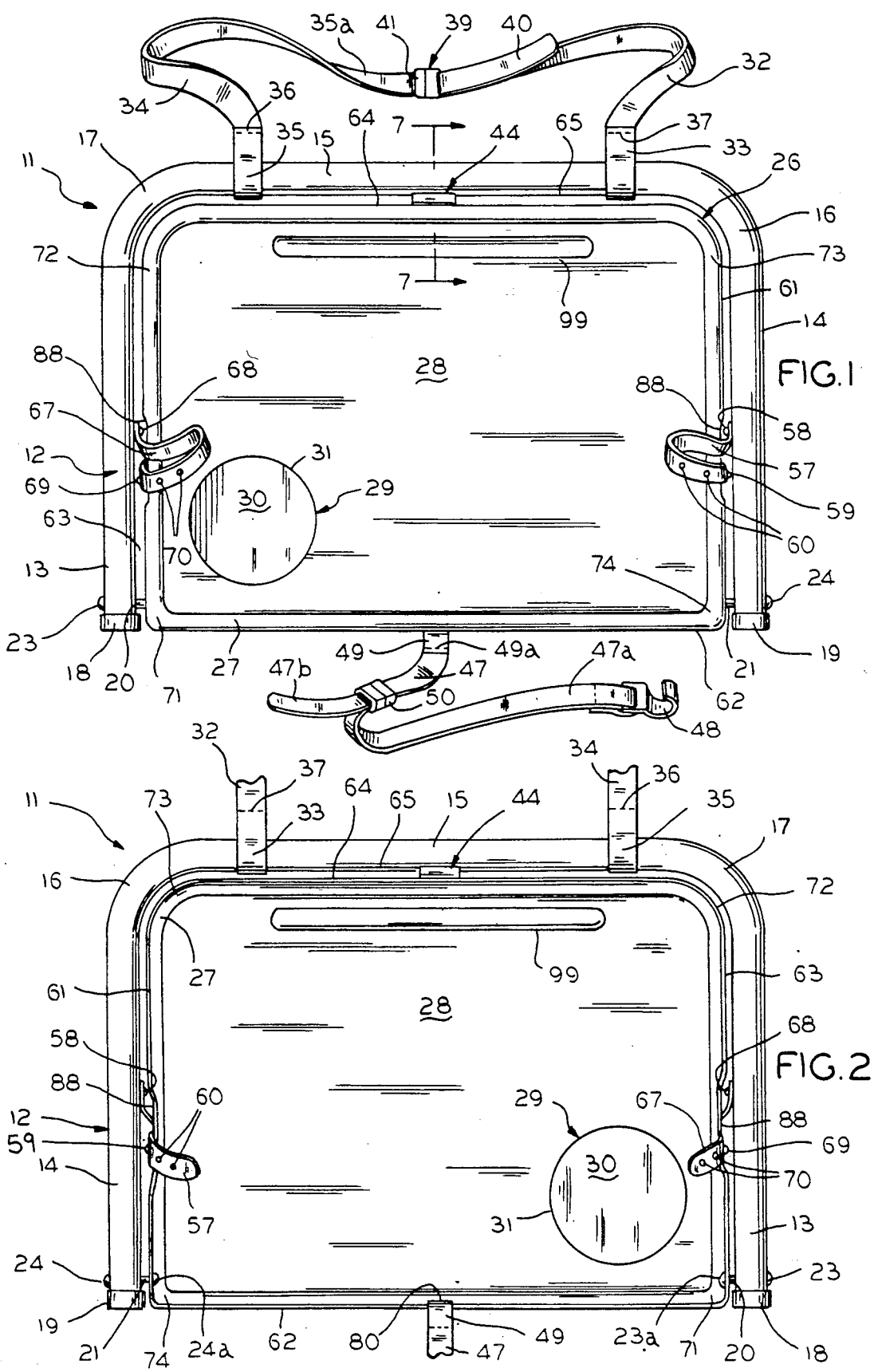

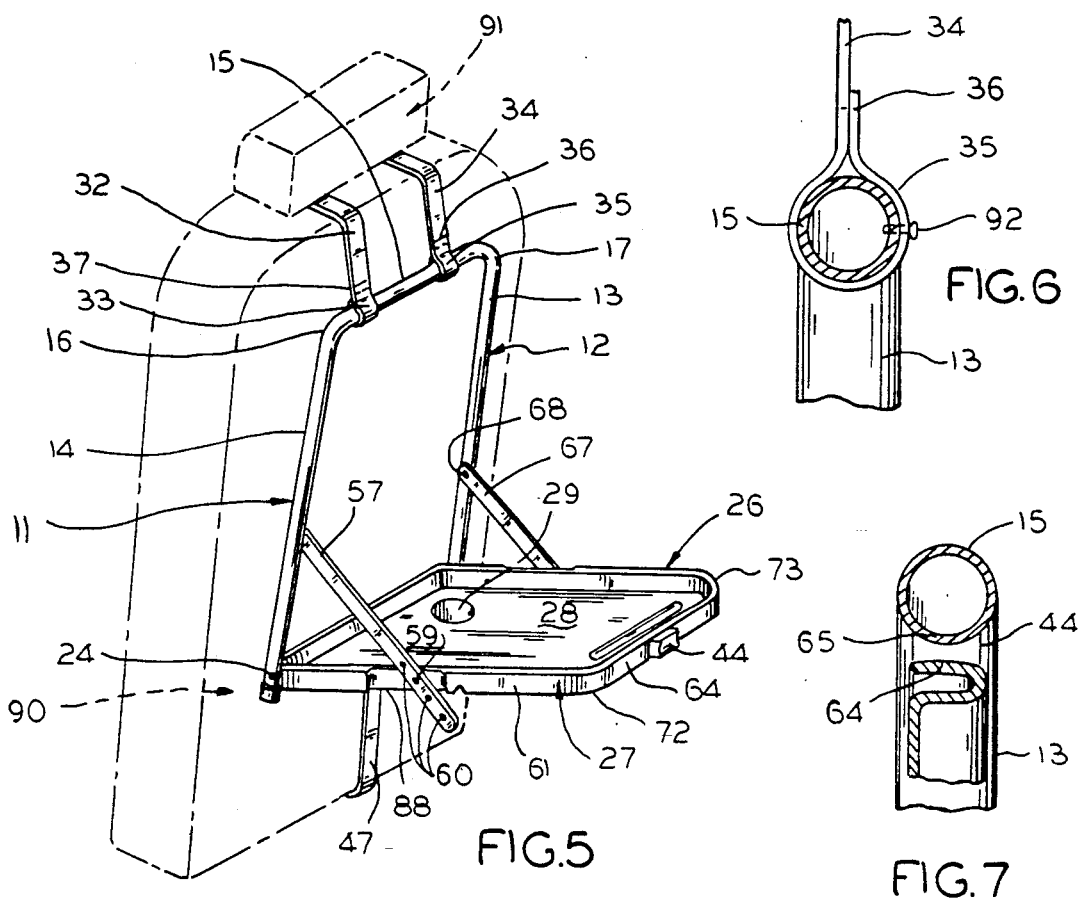
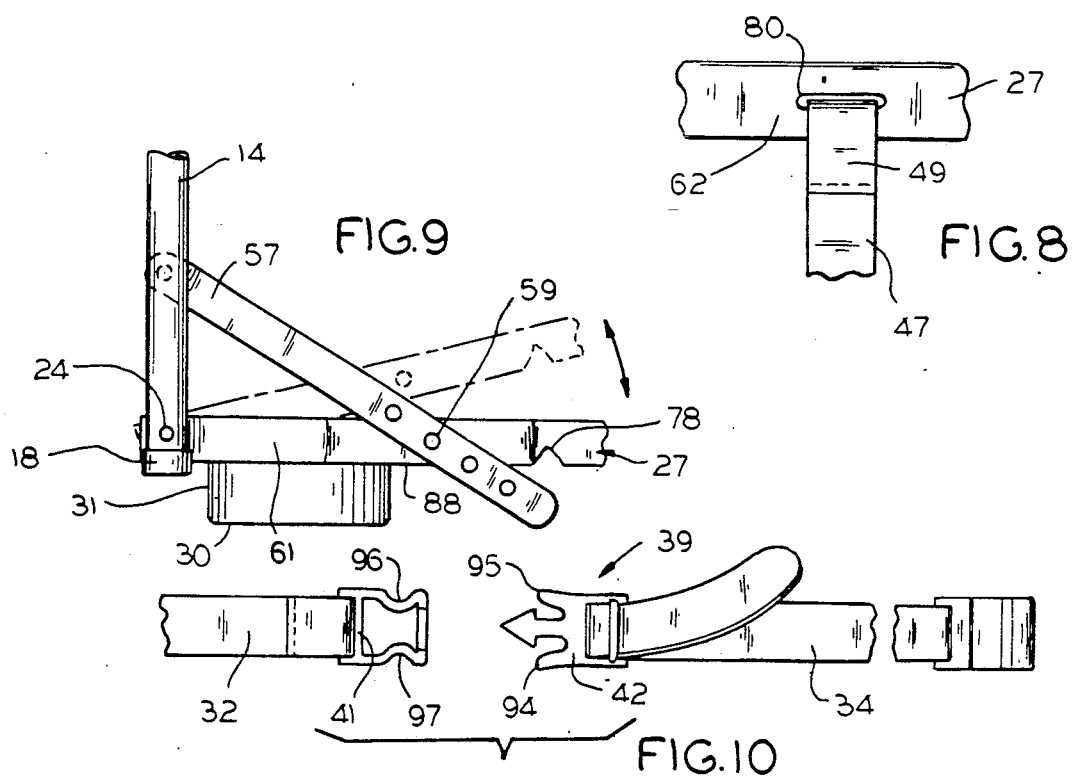

ADJUSTABLE FOLDING TRAY APPARATUS FOR ATTACHMENT TO A VEHICLE SEAT BACK

BACKGROUND OF THE INVENTION

The present invention relates in general to adjustable tray apparatus, and in particular, to an adjustable folding tray apparatus for attachment to a seat back for use primarily within an automobile, being easily attachable and detachable as well as adjustable both as to angular orientation and vertical orientation.

Various types and configurations of trays intended for use primarily within the interior of vehicles have been used in the past. Among such prior art table or tray apparatus are U.S. Pat. Nos.: 1,403,317 to Gross; 2,007,471 to Landgrebe; 2,100,261 to Montgomery; 2,584,006 to Finger; 2,654,616 to Mockli; 2,921,824 to Richter; 3,335,679 to Bown; 3,386,392 to Gramm; 3,554,139 and 3,625,161 to Rosner; 3,785,300 to Anderson; 3,817,190 to Evangelista; 4,265,447 to Shafer; 4,577,788 to Richardson; and European Patent Number 203,021; 2,322,755 to Voorhies; German Patent Number 197,804; and British Patent Number 1,093,019. In addition "built-in," fold-down trays have been provided for many years in seat backs of commercial airliners, trains and other vehicles. However, such conventional prior art tray apparatus have not successfully addressed the problem of facilitating attachment as well as detachment of such apparatus or the possible risk of injury posed by such apparatus to occupants of the vehicle when in the folded down or extended position.

It is accordingly an object of the present invention to provide an adjustable folding table apparatus which facilitates attachment as well as removal from the wide variety of different seat back configurations existing in automobiles and other vehicles, while avoiding any interference of the comfort and/or mobility of other passengers in the vehicle.

It is further an object of the present invention to provide an adjustable folding table apparatus having a construction serving to facilitate adjustment of both angular and vertical orientation of the tray portion.

It is also an object of the present invention to provide an adjustable folding tray apparatus capable of safely collapsing downwardly and away from the vehicle passengers upon impact in an extended position, of the magnitude normally encountered by a sudden stop or collision.

It is further an object of the present invention to provide an adjustable folding tray apparatus substantially devoid of exposed sharp edges.

It is also an object of the present invention to provide an adjustable folding tray apparatus which is relatively inexpensive and easy to manufacture.

These and other objects of the present invention will become apparent in light of the present specifications and drawings.

SUMMARY OF THE INVENTION

The present invention comprises an adjustable folding tray apparatus for attachment to a seat back for use primarily within an automobile or other vehicle. The apparatus has a tray portion pivotally rotatable between a substantially vertical stored position and a substantially horizontal extended position, with the tray portion positioned adjacent the back of the seat back. The frame means support the tray portion and abut the seat back as well. Pivot means are operably interposed between the frame means and the tray portion so as to pivotally attach the tray portion to the frame means. Adjustment means are also operably associated with the frame means and the tray portion for varying and maintaining the angular orientation of the tray portion relative to the frame means. Mounting means comprise mounting strap means operably attached to the frame means and extend around a portion of the seat back to the opposite side of the seat back, so as to secure the frame means to the seat back and allow for vertical adjustment of the tray portion along the height of the seat back. Locking or latch means are also operably interposed between the tray portion and the frame means from maintaining the tray portion in the retracted position.

Release means can also be operably attached to the mounting means so as to enable facilitated attachment and detachment of the apparatus from the seat back, as well as adjustment of the vertical orientation of the tray portion along the height of the seat back.

The apparatus can further include retaining means extending from the apparatus and releasably attaching to the seat back for maintaining the frame means in contact with the seat back. The retaining means include at least one retaining strap affixed to and extending from the tray portion at the first end and having a hook attached to its second end for engaging a portion of the seat back and further includes a buckle operably attached to the retaining strap for loosening or tightening of the retaining strap by lengthening or shortening the retaining straps.

Tray portion collapsing means are provided within the tray portion for safely collapsing the tray portion while in an extended position, upon impact by a force exceeding a predetermined magnitude, as would be encountered during a sudden stop or collision possibly propelling an occupant against the tray portion while it is in the down or extended position. The tray portion collapsing means can be notches formed in two opposite sides of the tray portion to enable downward bending of the tray along a transverse axis defined by a line extending across the tray portion from one notch to the other.

The mounting strap means can be one or more mounting straps attached to the frame means and extending around the top portion of the front side of the seat back so as to suspend the frame means from the seat back.

The mounting strap means can further include at least a second mounting strap, where each of the mounting straps is secured to the frame means at the first end and are operably attached to the release means at a second end. The release means can be a buckle comprising a male end portion attached to a first end of one of the mounting straps and a female end portion attached to another of the strap members for receipt of the male portion and tightening or loosening of the mounting straps about the seat back.

The frame means can be a substantially parallel pair of vertical support members for pivotable support of the tray portion in abutting relation to the seat back, as well as at least one substantially horizontal support member supporting between the vertical support members. Moreover, the vertical and horizontal support members can be formed of circular tubing that has a combined inverted U-shaped configuration.

The pivot means can be at least one pin connection between the frame means and the tray portion, wherein the pin connection operably connects each of the vertical support members to the sides of the tray portion to enable rotation of the tray portion about the pin connections. In the preferred embodiment, the pin connections are also located proximate the bottom of the vertical support members and proximate the back of the side edges of the tray portion.

The adjustment means has at least one flexible strap member having a first end attached to a pin protruding from the vertical support members and a second free end. The flexible strap member further has at least one aperture formed therein for engagement with at least one pin protruding from the tray portion. The strap members are straps formed of a flexible material.

The tray portion of the preferred embodiment has a substantially flat central portion. The upraised borders are integrally joined to and substantially surround the central portion for retention of any objects placed thereon. Moreover the upraised borders have substantially rounded corners and peaks for avoidance of sharp edges. In addition, the tray portion can include one or more raised or elevated portions formed in the central portion for receipt and retention of particular objects placed thereon, as well as indentations formed in the central portion for receipt or retention of additional objects.

The locking means include a catch affixed to the outside surface of the tray portion for engagement of an inside surface of the frame means by interference fit or otherwise. Conversely the locking means can comprise a catch affixed to the inside surface of the frame means for engagement of an outside surface of the tray portion by interference fit or otherwise.

BRIEF DESCRIPTION OF THE DRAWINGS

FIG. 1 is a front side elevation of the invention in its closed configuration.

FIG. 2 is a rear side elevation of the invention in its closed configuration.

FIG. 5 is a perspective view of the invention in its open configuration, positioned upon a vehicle seat back (shown in phantom).

FIG. 6 left side elevation of the invention, partly in section, showing the horizontal support member and one of the mounting straps.

FIG. 7 is a left side elevation of the invention, partly in section, showing the locking or latch means between the tray and the horizontal support member.

FIG. 8 is a partial rear side elevation of the tray portion, showing the retaining strap.

FIG. 9 is a partial left side elevation of the invention indicating the angular adjustability of the tray portion.

FIG. 10 is a top side elevation of the buckle for the mounting straps.

DETAILED DESCRIPTION OF THE DRAWINGS

Figure 3:
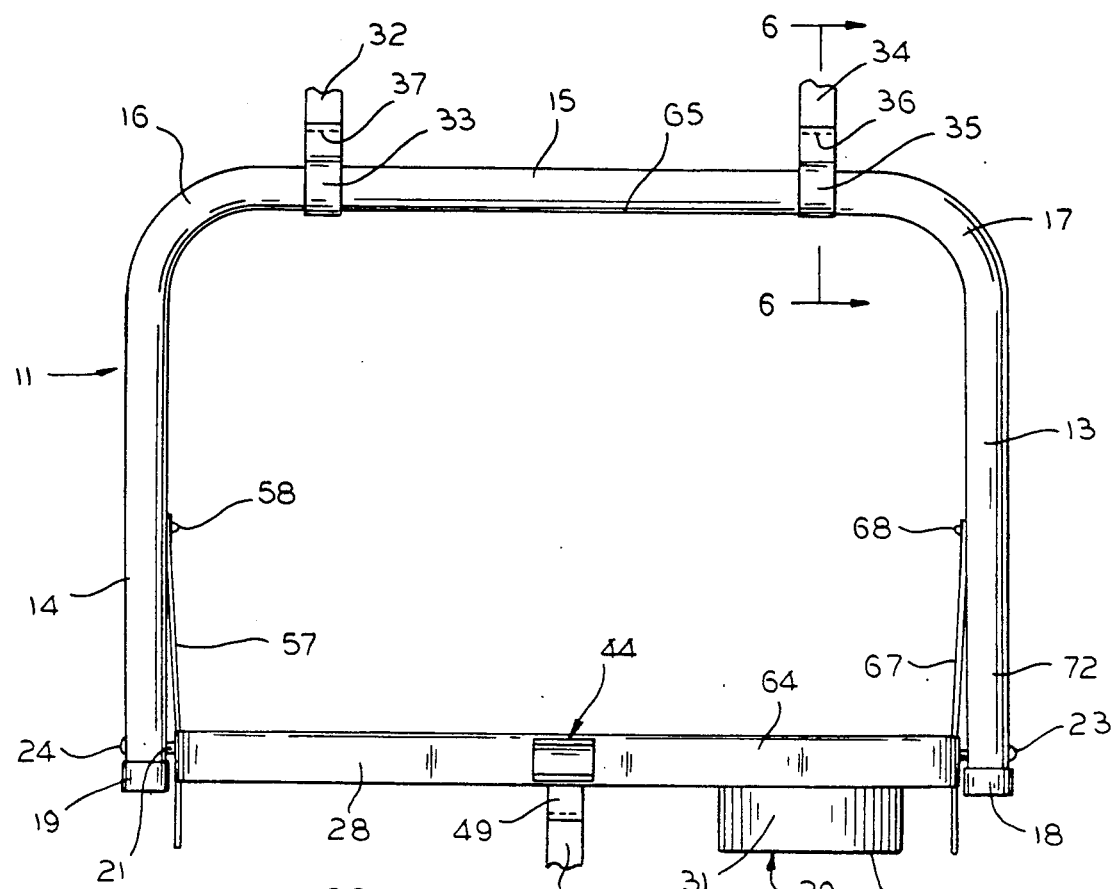
FIG. 3 is a front side elevation of the invention in its open configuration.

While this invention is susceptible of embodiment in many different forms, there is shown in the drawings and will herein be described in detail, one specific embodiments, with the understanding that the present disclosure is to be considered as merely an exemplification of the principles of the invention and is not intended to limit the invention to only the embodiments illustrated.

Referring to the drawings, there is shown a preferred embodiment of the inventive adjustable folding table apparatus 11 for attachment to a seat back for use primarily in automobiles and other vehicles. FIG. 1 shows the front of the apparatus 11 in its retracted state, and shows the side which would normally abut the seat back to which it would be attached. Frame means 12 is shown in FIG. 1 as comprising substantially vertical support members 13 and 14 and substantially horizontal support member 15 spanning there between. Frame means 12 has a combined, inverted U-shaped configuration with rounded corners 16 and 17. Caps 18 and 19 are provided on the open ends of vertical support members 13 and 14 respectively.

As further shown in FIG. 1, tray portion 26 includes flat central portion 28, and upraised border 27 which surrounds the outer perimeter of central region 28 of tray portion 26. Upraised border 27 has a rounded peak as shown in FIG. 7 and assists in retaining objects placed on central portion 28. The junction between central region 28 and border 27 is also rounded. In the preferred embodiment, tray portion 26 also includes recessed receptacle portion 29, having substantially vertical sides 31 and substantially flat bottom 30 for holding a beverage container or the like. However, other configurations for central portion 28 using different combinations of recessed receptacles such as 29 or pencil ledge 99, or elevated receptacles (not shown) are also contemplated as being within the scope of the invention. Tray portion 26 further includes rounded corners 71, 72, 73 and 74, joining sides 62, 63, 64 and 61, so as to reduce the risk of injury from contact with sharp edges, especially in the environment of the interior of a moving automobile or other vehicle.

As further shown in FIG. 1, tray portion 26 is pivotally mounted to frame means 12 by pivot means including pin connection 20 having head 23 and pin connection 21 having head 24. Accordingly, pin connections 20, 21 are interposed between frame 12 and tray portion 26 so as to enable tray portion 26 to be pivoted from a substantially vertical, stored position as shown, in FIG. 2 to a substantially horizontal, extended positioned as shown in FIG. 5.

Pin connections 20 and 21 are positioned proximate the bottom of support members 13 and 14 and tray portion 26 as viewed in FIG. 1. Cap members 18 and 19 provided on open bottom ends of support members 13 and 14, respectively, further eliminate exposed sharp edges. As further shown in FIGS. 1 and 2, bottom ends of cap members 18 and 19 of support members 13 and 14 are substantially aligned with the bottom edge of back side 62 of tray portion 26.

Mounting means are provided in the form of flexible mounting straps 32 and 34 attached to support member 15 along the top of frame means 12 as viewed in FIG. 1. Ends 35 and 33 of straps 34 and 32 are looped around support member 15 and attached to straps 34 and 32 by sewing, gluing or other such method along seams 36 and 37, respectively. To prevent rotation of support member 14 within the loops formed by ends 35 and 33 of straps 34 and 32, such straps may be glued or otherwise affixed such as by screws or rivets 92 (shown in FIG. 6) to support member 15. The opposite ends 35a and 40 of straps 34 and 32 are attached to adjustable buckle 39 having male end 42 received by female end 41, so as to enable tightening or loosening of straps 32 and 34 by lengthening or shortening loose end portion 40 of strap 32. Adjustment straps 57 and 67 are attached to both frame means 12 and tray portion 26. One end of strap 67 is attached to pin 68 mounted on the interior side of support member 13 and near the opposite end, attached to pin 69 in turn attached to interior side 63 of tray portion 26, penetrates one of the series of holes 70 formed in strap 67 so as to removably attach strap 67 to pin 69. Similarly, one end of strap 57 is attached to pin 58 of support member 14, while near the other end of strap 57, one of the series of holes 60 is removably attached to pin 59 of side 61 of tray portion 26. A gap is provided between frame means 12 and tray portion 26 so as to enable pins 68 and 69 and, 58 and 59 as well as the ends of adjustment straps 57 and 67 attached thereto, respectively, to fit therebetween, without substantially impeding the ability of tray portion 26 to pivot about pin connections 20 and 21. Alternatively, recesses 88 are formed in each of the sides 61 and 64 of tray portion 26 so as to accommodate straps 57 and 67 so as not to impede rotation of tray portion 26 about pin connections 20 and 21.

Locking means 44 in the preferred embodiment includes a catch interposed between side 64 of tray portion 26 and interior side 65 of support member 15. As shown in FIGS. 5 and 7, locking means 44 has a concave outer surface configured to receive the curved outer configuration of curved side 65 of support member 15 when tray portion 26 is folded up into the retracted or stored position.

Retaining means comprising retaining strap 47 serves to maintain frame means 12 in substantially abutting contact with the seat back 90 to which it is mounted, as shown in FIG. 5. As shown in FIGS. 1 and 8, end 49 of strap 47 is looped through slot 80 formed in back side 62 of tray portion 26 and fastened to strap 47 by sewing or gluing along seam 49a. Strap 47 can be divided into two portions 47a and 47b with portion 47a affixed to buckle 50 and portion 47b passing through buckle 50 so as to enable the free end of strap portion 47b to be used to adjust the overall length of strap 47. Strap 47 is provided with hook 48 for attachment to the bottom of the seat back 90 and in particular to an edge or interior surface thereof in the manner shown in FIG. 5.

The height of tray portion 26 can be varied without substantially changing the angular orientation of tray portion 26 with respect to frame means 12 by tightening or loosening of mounting straps 34 and 32 and correspondingly conversely tightening or loosening retaining strap 47. If mounting straps 34 and 32 are tightened and retaining strap 47 loosened, the effect will be to raise apparatus 11 vertically along seat back 90. If however, mounting straps 34 and 32 are loosened and retaining strap 47 tightened, apparatus 11 will be vertically lowered along seat back 90. The angular orientation of tray portion 26 may then be adjusted by use of adjustment straps 57 and 67 and their respective series of holes 60 and 70, respectively.

Likewise while adjusting the lengths and/or positions of retaining strap 47 and mounting straps 32 and 34, the orientation of tray portion 26 can be adjusted so that front side 65 is level with respect to the horizontal when viewed as in FIG. 3.

The invention as shown in FIG. 2 is in the closed or stored position and aligned as it would be when mounted on the back of a seat back as shown in FIG. 5. The bottom of substantially flat central portion 28 of tray portion 26 is shown surrounded by the inside recessed channel of peripheral border 27. The body of pin connection 21 having head 24 and end 24a passes through both support member 14 and side 61 of tray portion 26 while being retained by head 24 and end 24a so as to provide a pivot point about pin connection 21. Similarly, the body of pin connection 20 having head 23 and end 23a passes through support member 13 and side 63 of tray portion 26 while being maintained by head 23 and end 23a so as to provide a second pivot point aligned with pin connection 21, for rotation of tray apparatus 28 about the axis defined by pin connections 20 and 21 with respect to frame means 12. Pin connections 23 and 24 can be standard screw and nut combinations or rivets and caps, so long as rotation by tray portion 26 about such pin connections 20, 21 is allowed. Alternatively, pin connections 20 and 21 can be a single shaft or screw passing from the exterior of member 13, through member 13, through tray portion 26, through member 14 and extending from the outside of member 14, with speed nuts or bolts attached to the one or more free ends. Bottom 30 of receptacle 29 and sides 31 extend outwardly from central portion 28. Free ends of straps 57 and 67 extend beyond bottom 30 of central portion 28 as shown in FIG. 2. Locking means 44 serves to hold tray portion 26 in the stored position as shown. In order to unlock or release tray portion 26 from the stored position shown in FIG. 2 and to fold it down into the extended position shown in FIG. 5, the user reaches between the support member 15 and the seat back 90 it is mounted upon, applies manual pressure to the top surface (as viewed in FIG. 1) of central portion 28 and dislodges the catch of locking means 44 from support member 15 which was seated thereon, thereby enabling folding down of tray portion 26 as shown in FIGS. 5 and 9. In order to relock the tray apparatus in the stored position, upward pressure is applied to the bottom of tray portion 26 (as viewed in FIG. 5) to rotate tray portion 26 upward as shown in FIG. 9 until the catch of locking means 44 again engages side 65 of support member 15, as shown in FIG. 2, in a snap-fit or interference fit fashion.

Also shown in FIG. 2 are substantially vertical support members 15 and 13 as well as horizontal support member 14 which meet at rounded corners 16 and 17. Caps 19 and 18 are shown covering open ends of support members 15 and 13, respectively, which comprise hollow circular tubing. Straps 32 and 34 are attached to horizontal support member 14 and have ends 35 and 33 looped around member 14 and sealed along seams 36 and 37. Locking means 44 is affixed to side 64 of tray portion 26 and in contact with side 65 of member 14 in interposed fashion therebetween. Alternatively, locking means 44 can be affixed to side 65 of member 14 and configured to engage side 64 of tray portion 26. Also shown is the gap between frame means 12 and tray portion 26, as well as recesses 88 in sides 61 and 63. Frame means 12 is configured so as to accommodate the shape of tray portion 26 within its inner perimeter, while still providing the necessary gap between the two to enable rotation of tray portion 26 about pin connections 21 and 20. Also shown in FIG. 2 are rounded corners 73 and 72 and sides 61, 62, 63 and 64 of tray portion 26. Restraining strap 47 has end 49 looped through slot 80 formed in the back of tray portion 26.

The invention 11 when folded down to the extended position with tray portion substantially perpendicular to vertical members 15 and 13, appears as shown in FIG. 3. When mounted to a seat back 90 and folded down as shown in FIG. 5, tray apparatus 26 is substantially horizontal and frame means 12 oriented substantially vertically when viewed as in FIG. 4. With reference to FIG. 3, adjustment straps 57 and 67 are substantially taught when tray portion 26 is in the extended position.

Retaining strap 47 extends downward and engages the bottom of the seat back 90 so as to draw the apparatus 11 and in particular the back of the tray portion 26 toward and up against the seat back. Also shown in FIG. 3 are frame means 12 and in particular the inverted U-shaped configuration of vertical support members 14 and 13 spanned by horizontal support member 15 and rounded corners 16 and 17. Ends 33 and 34 of straps 32 and 34 respectively, are looped around member 15 and attached thereto. The loops of mounting straps 32 and 33 are joined along seams 37 and 36. Adjustment straps 57 and 58 are joined to pins 58 and 59, and 68 and 69 respectively. Locking means 44 in the form of a catch having an outside substantially concave shape substantially conforming to the outer circular shape of member 14 is affixed to front side 64 of tray portion 26. Corners of tray portion 26 and frame means 12 are especially rounded to reduce the risk of injury from impact with an exposed sharp corner.

Figure 4:
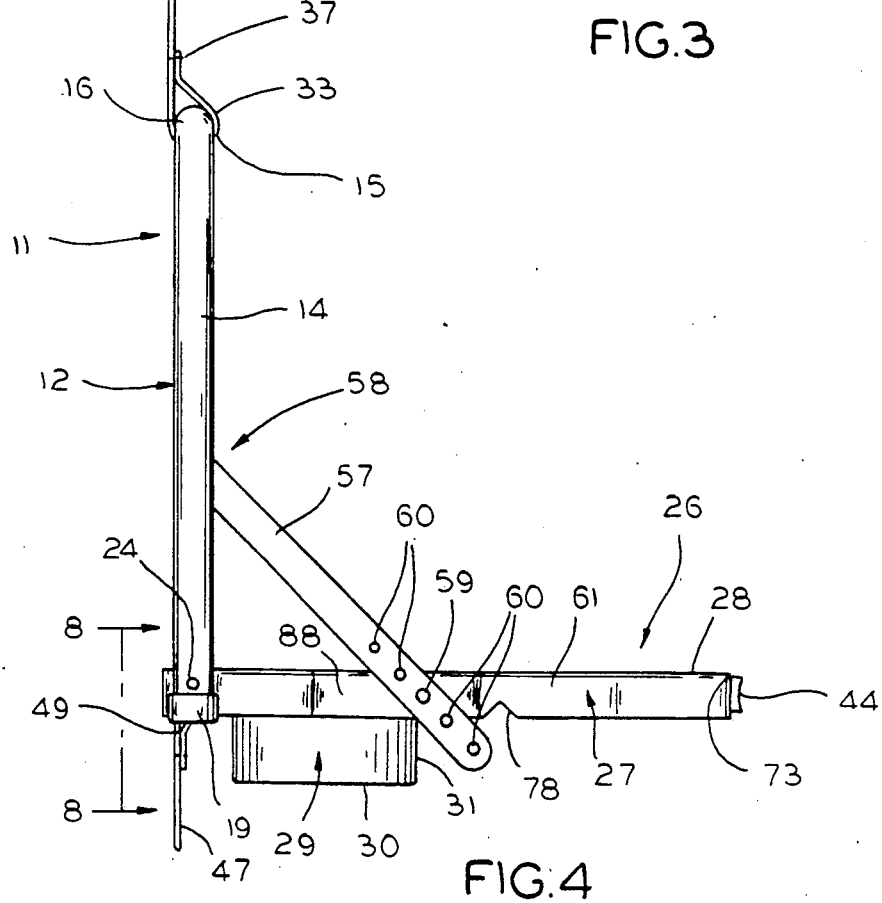
FIG. 4 is a left side elevation of the invention in its open configuration.

FIG. 4 shows invention 11 with tray portion 26 in a folded down or extended position as viewed from the side. Mounting strap 32 having end 33 and seam 37 are looped around and attached to member 14. Adjustment strap 57 is attached at a top end to the inside surface of vertical member 14 and to pin 59 of tray portion 26 mounted in recess 88 of side 61 near a second end through one of the several holes provided in strap 57. Accordingly as shown in FIG. 9, the angle of the tray portion 26 relative to vertical member 15 can be altered or adjusted by detaching straps 57 and 67 from their respective pins 59 and 69 and reattaching them at a corresponding different set of holes of the series 60 and 70. To decrease the angle between substantially vertical support members 14 and 13 a higher set of holes in series 60 and 70 is selected for engagement with pins 57 and 67. To increase the angle between tray portion 26 and members 14 and 13 respectively, a lower set of holes of series 60 and 70 is selected. Hence, since all seat backs are not exactly vertical or perpendicular with respect to the vehicle floor and vary from vehicle to vehicle, such differences can be compensated for by use of the adjustment straps so as to thereby maintain or achieve the desired orientation of tray portion 26 with respect to the horizontal or floor and/or seat of the vehicle.

Also shown in FIG. 4 are rounded corner 16, head 24 of pin connection 21, cap 19, side 61 of raised border 27, restraining strap 47, recessed receptacle 29 having a bottom 30 and sides 31. Locking means 44 formed of a catch attached to front side 64 of tray portion 26, has a front surface having a substantially concave outer configuration to enable engagement with the inner surface 65 of member 14 by receipt thereof and interference fit. Alternatively, a snap fit or interlocking tab arrangement can be used to hold side 65 of member 15. Adjusting straps 57 and 67 serve to limit the angular rotation of tray portion 26 with respect to frame means 12. If not stopped by straps 57 and 67, tray portion 26 could rotate a full 360 degrees about pin connections 21 and 20. Also shown are tray portion collapsing notches 78 formed in both sides 61 and 63 (not shown) of tray portion 26 to enable collapse of the front portion of tray portion 26 in a downward direction away from the passengers as viewed in FIG. 4 along an axis defined by notches 78, upon impact by a force greater than a predetermined magnitude, such as would be encountered by a vehicle passenger being thrown into table apparatus 11 during a sudden stop or collision. Alternatively, tray portion 26 and/or pin connections 20 and 21 can be configured so as to "break away" from frame means 12 upon impact in a collision or sudden stop so as to fall harmlessly to the floor of the vehicle.

FIG. 5 shows invention 11 in an extended position mounted on a seat back 90 (shown in phantom). Mounting straps 32 and 34 are shown extending around to the front of the seat back 90, between the main seat back portion and the head restraint portion 91 (both shown in phantom) so as to secure invention 11 to the seat back 90. Though not visible in FIG. 5, release means in the form of buckle 39 shown in FIG. 1 would be located on the front side of the seat back 90, when viewed as in FIG. 5, though positioned between the headrest portion 91 and the main seat back portion of seat back 90. Retaining strap 47 is shown attached to the bottom of the seat back 90. Detachment of the apparatus 11 from the seat back 90 is facilitated by releasing mounting straps 32 and 34 by opening buckle 41, separating female portion 41 from male portion 42 and removing retaining strap 47 from the bottom of the seat back 90, so as to enable removal of the apparatus 11. The apparatus 11 can then be transferred and remounted in another vehicle in the previously described manner.

Also shown in FIG. 5 are: support members 13, 14 and 15; adjustment straps 57 and 67; ends 33 and 35 of straps 32 and 34; pin 59; series of holes 60; head 24 of connection pin 21 notch 78; side 61 of tray portion 26; locking means 44; recessed receptacle 29 and curved corners 16 and 17 of frame means 12. Though not shown, apparatus 11 can be reversed so as to abut the front of seat back 90 with mounting straps 32 and 34 extending around and latching in back (as viewed in FIG. 5) of headrest portion 91 of seat back 90.

FIG. 6 shows end 35 of mounting strap 34 looped around support member 15 and fixed to strap 34 along seam 36 by gluing or sewing or other affixation method. In addition, looped strap 34 is kept from rotating about support member 15 by rivet 92 piercing end 35 and being screwed into member 15. Rivets or staples can also be used to attach strap 34 to member 15. Also shown is support member 13.

Locking or latching means 44 mounted on side 64 of tray portion 26 having a substantially concave outer surface is shown engaged to side 65 of support member 15 and retain tray portion 26 in closed or retracted position. As shown tray portion 26 is held in place by receipt of support member 15 within the concave outer surface by interference fit or alternatively depending on the configuration of the outer surface of locking means 44 in a snap-fit arrangement. Also shown is vertical support member 13.

Retaining strap 47 is shown looped through slot 80 formed in back side 62 of tray portion 26 within raised border 27.

FIG. 9 shows how engagement upon pin 59 of a different one of the series of holes 60 provided on attachment strap 57 (as well as corresponding adjustment of attachment strap 67) results in angular displacement (either upwardly or downwardly depending upon the set of holes selected) of tray portion 26 with respect to substantially vertical support member 15, in the previously described manner. Also shown are cap 18, head 24 of pin connection 21, and collapsing notch 78. Collapsing notches serve to make sides 61 and 63 weaker at those points and more likely to make the front of tray portion 26 to bend downward upon impact along an axis defined by such oppositely positioned notches 78. Tray portion 26 can be formed of a material that would bend upon impact above a predetermined safe amount along the axis defined by notches 78. Alternatively tray portion 26 can be formed of a material that would detach from frame means 12 upon impact exceeding a safe limit.

Buckle 39 is shown in FIG. 10 as including female portion 41 attached to mounting strap 32 and male portion 42 attached to strap 34. Once engaged in the form shown in FIG. 1, squeezing of tabs 94 and 95 of male portion 42, protruding from openings 96 and 97 of female portion 41 will allow strap 34 to be pulled out of engagement with strap 32.

In operation, apparatus 11 is mounted by extending mounting straps 34 and 32 around headrest portion 91 of seat back 90 (shown in phantom) and then joining male portion 42 and female portion 41 of buckle 39 around the front of seat back 90. In the preferred embodiment mounting straps 32 and 34 pass between head rest portion 91 and the main portion of seat back 90. As a result the comfort of the passenger seated therein is not affected. Free end 40 is then either let out to loosen straps 34 and 32 or taken in in order to tighten straps 34 and 32. Retaining strap 47 is then extended and attached by way of hook 48 to the bottom of seat back 90. Tray portion 26 is then folded down by dislodging locking or latch means 44 of tray portion 26 from member 15 and rotating tray portion 26 downward until adjustment straps 57 and 67 are fully extended, as shown in FIG. 3. Tray portion 26 is folded up by pushing up on the bottom of tray portion 26 until tray portion 26 is placed within frame means 12 and the latch of locking or latch means 44 snaps otherwise or gets lodged back into place with member 15 received within concave surface of locking or latch means 44.

In the referenced embodiment, frame means 12 is comprised of a single piece of hollow plastic or metal tubing having a substantially circular cross-section and bent at rounded corners 16 and 17. Tray portion 26 is of injection-molded plastic, though other materials or methods of construction could be used.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An adjustable folding table apparatus for attachment to a seat back having first and second sides, a bottom, a top, and a head-rest on said top for use primarily within an automobile or other vehicle comprising:
    a tray portion pivotally rotatable between a substantially vertical, stored position and a substantially horizontal, extended position and positioned adjacent said first side of said seat back;
    frame means for supporting said tray portion from said frame means, said frame means abutting said first side of said seat back;
    pivot means operably interposed between said frame means and said tray portion so as to pivotally attach said tray portion to said frame means;
    adjustment means operably associated with said frame means and said tray portion for varying and maintaining the angular orientation of said tray portion relative to said frame means;
    mounting means operably attached to said frame means and extending around a portion of said head-rest and being substantially flexible, so as to secure said frame means to said seat back and allow for vertical adjustment of said tray portion along the height of said seat back;
    locking means operably interposed between said tray portion and said frame means for maintaining said tray portion in said retracted position; and
    retaining means extending from said bottom of said apparatus and releasably attached to a portion of said bottom of said seat back for maintaining said frame means substantially in contact with said seat back.

2. The invention according to claim 1 wherein said apparatus further comprises release means operably attached to said mounting means so as to enable facilitated attachment and detachment of said apparatus from said head-rest, as well as adjustment of the vertical orientation of said tray portion along the height of said seat back.

3. The invention according to claim 1 wherein said retaining means further comprises:
    at least one retaining strap affixed to and extending from said tray portion at a first end and having a hook attached at said second end for engaging a portion of said seat back; and
    a buckle operably attached to said at least one retaining strap for loosening or tightening of said retaining strap by lengthening or shortening said at least one retaining strap.

4. The invention according to claim 2 wherein said mounting means comprises at least one mounting strap attached to said frame means and extending around a portion of said head-rest on said top of said seat back so as to suspend said frame means from said seat back.

5. The invention according to claim 4 wherein said mounting strap means further comprises at least a second mounting strap, each of said mounting straps secured to said frame means at a first end thereof and operably attached to said release means at a second end thereof.

6. The invention according to claim 5 wherein said release means comprises a buckle including a male end portion attached to a first end of one of said mounting straps and a female end portion attached to another of said strap members for receipt of said male portion and tightening or loosening of said mounting straps about said seat back.

7. The invention according to claim 1 wherein said frame means comprises:
    a substantially parallel pair of vertical support members for pivotable support of said tray portion in abutting relation to said seat back; and
    at least one substantially horizontal support member spanning between said vertical support members.

8. The invention according to claim 7 wherein said frame means further comprises said vertical and horizontal support members being formed of circular tubing and having an inverted Ushaped configuration.

9. The invention according to claim 1 wherein said pivot means comprises at least one pin connection between said frame means and said tray portion.

10. The invention according to claim 9 wherein said pivot means further comprises said at least one pin connection operably connecting each of said vertical support members to the sides of said tray portion to enable rotation of said tray portion about said pin connections.

11. The invention according to claim 10 wherein said at least one pin connection is located proximate the bottom of said vertical support members and proximate the back of the side edges of said tray portion.

12. The invention according to claim 8 wherein said adjustment means comprises:
  at least one flexible adjustable strap member having a first end, attached to one of said vertical support members, and a second free end;
  said at least one flexible adjustable strap member further having at least one aperture formed therein for engagement with said tray portion; and
  at least one protruding pin member corresponding to said at least one adjustable strap member and affixed to said tray portion for receipt of said at least one aperture of said corresponding adjustable strap member.

13. The invention according to claim 11 wherein said at least one adjustable strap member comprises a strap formed of a flexible material.

14. The invention according to claim 1 wherein said tray portion further comprises:
  a substantially flat central portion;
  upraised borders integrally joined to and substantially surrounding said central portion for retention of objects placed thereon; and
  said upraised borders further having substantially rounded corners and peaks for avoidance of sharp edges.

15. The invention according to claim 14 wherein said tray portion further comprises one or more indentations formed in said central portion for receipt and retention of objects placed thereon.

16. The invention according to claim 14 wherein said tray portion further comprises one or more raised portions formed in said central portion for receipt and retention of objects placed thereon.

17. The invention according to claim 1 wherein said locking means comprises a catch affixed to an outside surface of said tray portion for engagement of an inside surface of said frame means by interference fit.

18. The invention according to claim 1 wherein said locking means further comprises a catch affixed to an inside surface of said frame means for engagement of an outside surface of said tray portion by interference fit.

19. An adjustable folding table apparatus for attachment to a seat back having first and second sides for use primarily within an automobile or other vehicle comprising:
  a tray portion pivotally rotatable between a substantially vertical, stored position and a substantially horizontal, extended position and positioned adjacent first side of said seat back;
  frame means for supporting said tray portion from said frame means, said frame means abutting said first side of said seat back;
  pivot means operably interposed between said frame means and said tray portion so as to pivotally attach said tray portion to said frame means;
  adjustment means operably associated with said frame means and said tray portion for varying and maintaining the angular orientation of said tray portion relative to said frame means;
  mounting means operably attached to said frame means and extending around a portion of said seat back so a to secure said frame means to said seat back and allow for vertical adjustment of said tray portion along the height of said seat back;
  locking means operably interposed between said tray portion and said frame means for maintaining said tray portion in said retracted position;
  tray portion collapsing means within said tray portion, providing for the safe collapse of said tray portion while in an extended position, upon impact by a force exceeding a predetermined magnitude; and
  said tray portion collapsing means comprises notches formed in said sides of said tray portion to enable downward bending of said tray portion substantially about a transverse axis extending between said notches.

* * * * *